(12) United States Patent
Maeda (10) Patent No.: US 8,142,022 B2
(45) Date of Patent: Mar. 27, 2012

(54) IMAGE DISPLAY APPARATUS

(75) Inventor: Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 12/472,263

(22) Filed: May 26, 2009

(65) Prior Publication Data

US 2009/0296047 A1    Dec. 3, 2009

(30) Foreign Application Priority Data

May 28, 2008   (JP) .................................. 2008-139362

(51) Int. Cl.
*G03B 21/14* (2006.01)
(52) U.S. Cl. .................. 353/20; 349/9; 353/94
(58) Field of Classification Search ............ 353/20, 353/38, 94; 349/5, 7, 8, 9
See application file for complete search history.

(56) References Cited

U.S. PATENT DOCUMENTS

| | | | |
|---|---|---|---|
| 6,336,724 B1 * | 1/2002 | Shouji et al. ............ | 353/20 |
| 6,497,488 B1 * | 12/2002 | Yamauchi et al. ......... | 353/38 |
| 6,921,176 B2 * | 7/2005 | Tomita et al. ........... | 353/94 |
| 7,232,223 B2 * | 6/2007 | Koide ................... | 353/20 |
| 2004/0196443 A1 | 10/2004 | Tomita et al. | |
| 2006/0290892 A1 | 12/2006 | Koide | |
| 2007/0165185 A1 * | 7/2007 | Chen .................... | 353/20 |
| 2009/0196036 A1 * | 8/2009 | Sannohe et al. .......... | 362/247 |

FOREIGN PATENT DOCUMENTS

| | | |
|---|---|---|
| EP | 1115255 A1 | 7/2001 |
| EP | 1370089 A1 | 12/2003 |
| JP | 11-096803 A | 4/1999 |
| JP | 2000-155291 A | 6/2000 |
| JP | 2001-264697 A | 9/2001 |

OTHER PUBLICATIONS

Takahashi Makoto, May 4, 2011 Machine Translation of Projector Device Patent Application, Japanese Laid Open Patent Application, pp. 1-7, JP2001-264697A, Publisher: Google.com, USA.

* cited by examiner

*Primary Examiner* — William C Dowling
(74) *Attorney, Agent, or Firm* — Canon USA, Inc., I.P. Division (57) ABSTRACT

An image display apparatus includes an illumination optical system that includes first and second beam splitting units, a first polarization conversion element, third and fourth beam splitting units, a second polarization conversion element, a first beam combining unit configured to combine a plurality of first polarized light beams with a plurality of second polarized light beams, a third polarization conversion element configured to convert a plurality of combined light beams into a plurality of polarized light beams, and a condensing unit configured to superimpose the plurality of polarized light beams onto the image display element, wherein each of the first and third beam splitting units includes a cylinder lens array.

15 Claims, 8 Drawing Sheets

IMAGE DISPLAY APPARATUS

BACKGROUND OF THE INVENTION

1. Field of the Invention

The present invention relates to an image display apparatus configured to display an image by utilizing light modulated by an image display element, and more particularly to the image display apparatus configured to illuminate the image display element by utilizing light beams from a plurality of light sources.

2. Description of the Related Art

An image display apparatus, such as a liquid crystal projector (image projection apparatus) often utilizes, as a light source, a discharge lamp such as a high-pressure mercury lamp or a xenon lamp. However, in the discharge lamp, as wattage increases an arc length increases, and as an arc length increases the light quantity used to illuminate the image display element decreases among a light emission amount from the discharge lamp or the light utilization efficiency decreases. Therefore, if only a single discharge lamp is used, there is a limit in improving the light utilization efficiency and in obtaining a brighter projected image.

Accordingly, Japanese Patent Laid-Open No. 2001-264697 discloses an image projection apparatus that uses a plurality of light sources or is configured as a multi-light type so as to increase the light quantity used to illuminate the image display element and to project a brighter image. This image projection apparatus converts light beams from two light sources into P-polarized light and S-polarized light respectively through two polarization conversion elements, combines the P-polarized light and S-polarized light with each other by using a polarization beam splitter ("PBS"), converts the combined light into P-polarized light or S-polarized light through another polarization conversion element, and introduces the converted light to the image display element.

The polarization conversion element in combination with an integrator system can provide high polarization conversion efficiency. Therefore, the image projection apparatus disclosed by Japanese Patent Laid-Open No. 2001-264697 arranges two polarization conversion elements and two integrator systems in an optical path from each light source to the image display element.

However, the light utilization efficiency (illumination efficiency) remarkably lowers as a result of that the two integrator systems are arranged in the optical path from the light source to the image display element. Hence, it is difficult to obtain sufficiently high illumination efficiency in the image projection apparatus disclosed by Japanese Patent Laid-Open No. 2001-264697.

SUMMARY OF THE INVENTION

The present invention provides an image display apparatus that provides excellent polarization conversion efficiency in a polarization conversion element, and high illumination efficiency in an illumination optical system.

An image display apparatus according to one aspect of the present invention is configured to display an image, and includes an illumination optical system configured to introduce a light beam from a first light source and a light beam from a second light source to an image display element. The illumination optical system includes a first beam splitting unit configured to split the light beam from the first light source into a plurality of light beams on a first section, a second beam splitting unit configured to split the light beam from the first light source into a plurality of light beams on a second section orthogonal to the first section, a first polarization conversion element configured to convert the light beam from the first light source as a non-polarized light beam into first polarized light beams having a first polarization direction, a third beam splitting unit configured to split the light beam from the second light source into a plurality of light beams on the first section, a fourth beam splitting unit configured to split the light beam from the second light source into a plurality of light beams on the second section, a second polarization conversion element configured to convert the light beam from the second light source as a non-polarized light beam into second polarized light beams having a second polarization direction orthogonal to the first polarization direction, a first beam combining unit configured to combine a plurality of first polarized light beams that have passed the first beam splitting unit, the second beam splitting unit, and the first polarization conversion element with a plurality of second polarized light beams that have passed the third beam splitting unit, the fourth beam splitting unit, and the second polarization conversion element, a third polarization conversion element configured to convert a plurality of combined light beams from the first beam combining unit into a plurality of polarized light beams having a polarization direction of one of the first polarization direction and the second polarization direction, and a condensing unit configured to superimpose the plurality of polarized light beams from the third polarization conversion element onto the image display element, wherein each of the first beam splitting unit and the third beam splitting unit includes a cylinder lens array.

Further features of the present invention will become apparent from the following description of exemplary embodiments (with reference to the attached drawings).

DESCRIPTION OF THE EMBODIMENTS

Referring now to the accompanying drawings, a description will be given of embodiments of the present invention.

First Embodiment

Figure 1:
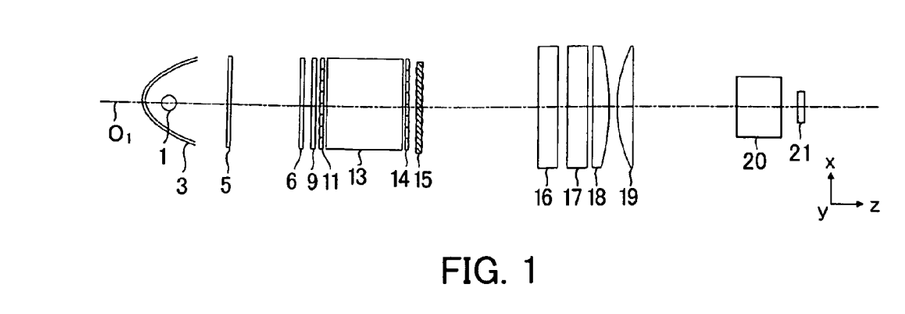
FIG. 1 shows an XZ section of an optical system in an image projection apparatus according to a first embodiment the present invention.
Figure 2:
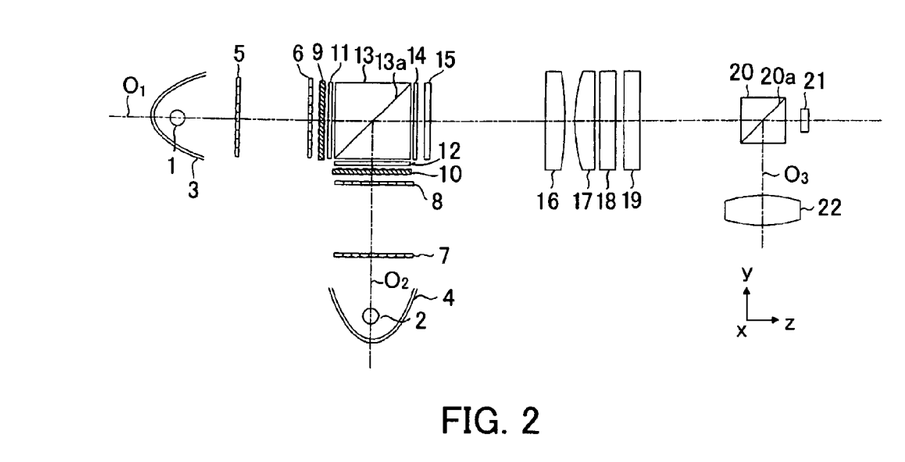
FIG. 2 shows a YZ section of the optical system according to the first embodiment.

FIGS. 1 and 2 show an overall optical system in an image projection apparatus (image display apparatus) according to a first embodiment of the present invention. FIG. 1 shows an XZ section (second section), and FIG. 2 shows a YZ section (first section) of the overall optical system. The XZ section is a section parallel to a long side direction of the image display element, such as 4:3 or 16:9, and the YZ section is a section parallel to a short side direction of the image display element.

In the following description, light is synonymous with a light beam (luminous flux), and polarized light is synonymous with a polarized light beam. Each of X, Y, and Z denotes a direction orthogonal to each other, and each of "a," "b," and "c" denotes a direction orthogonal to each other.

Reference numeral 1 denotes a first light source, and reference numeral 2 denotes a second light source. Each of these first and the second light sources 1 and 2 includes a discharge light emitting tube, such as a high-pressure mercury lamp or a xenon lamp. Reference numeral 3 denotes a first parabolic reflector, and reference numeral 4 denotes a second parabolic reflector.

Reference numeral 5 denotes a first cylinder array as a first beam splitting unit, and reference numeral 6 denotes a second cylinder array.

Reference numeral 7 denotes a third cylinder array as a third beam splitting unit, and reference numeral 8 denotes a fourth cylinder array.

Reference numeral 9 denotes a first polarization conversion element, and reference numeral 10 denotes a second polarization conversion element.

Reference numeral 11 denotes a fifth cylinder array as a second beam splitting unit, and reference numeral 12 denotes a sixth cylinder array as a fourth beam splitting unit.

Reference numeral 13 denotes a polarization combining (or synthesis) prism (PBS) as a first beam combining unit, which includes a polarization combining surface (polarization splitting surface) 13a.

Reference numeral 14 denotes a seventh cylinder array. Reference numeral 15 denotes a third polarization conversion element.

Reference numeral 16 denotes a first cylinder lens, and reference numeral 17 denotes a second cylinder lens. Reference numeral 18 denotes a third cylinder lens, and reference numeral 19 denotes a fourth cylinder lens. A condensing unit (condenser optical system) includes these first to fourth cylinder lenses 16-19.

An illumination optical system includes a plurality of optical elements from the first cylinder array 7 to the fourth cylinder lens 19.

Reference numeral 20 denotes a polarization splitting prism (PBS), which includes a polarization separation surface 20a.

Reference numeral 21 denotes a reflective liquid crystal panel as an image display element. Reference numeral 22 denotes a projection lens (projection optical system). $O_1$ denotes an optical axis from the first light source 1 to the liquid crystal panel 21, and $O_2$ denotes an optical axis from the second light source 2 to the polarization combining prism 13 (liquid crystal panel 21). $O_3$ denotes an optical axis from the liquid crystal panel 21 (polarization splitting prism 20) to the projection lens 22.

As shown in FIG. 2, each of the first to fourth cylinder arrays 5-8 includes a plurality of cylinder lenses each of which has a power (which is a reciprocal of a focal length and may be regarded as refractive power) on the YZ section, and the plurality of lenses are arranged in the Y or Z direction and extend in a direction parallel to the X direction.

The fifth and seventh cylinder arrays 11 and 14 include a plurality of cylinder lenses each of which has a power on the XZ section, as shown in FIG. 1, and the plurality of lenses are arranged in the X direction and extend parallel to the Y direction. The sixth cylinder arrays 12 include a plurality of cylinder lenses each of which has a power on the XY section, and the plurality of lenses are arranged in the X direction and extend parallel to the Z direction.

Each of the first, third, fifth, and sixth cylinder arrays 5, 7, 11, and 12 divides an incident light beam into a plurality of light beams only in a direction in which its plurality of cylinder lenses has a power.

Figure 3:
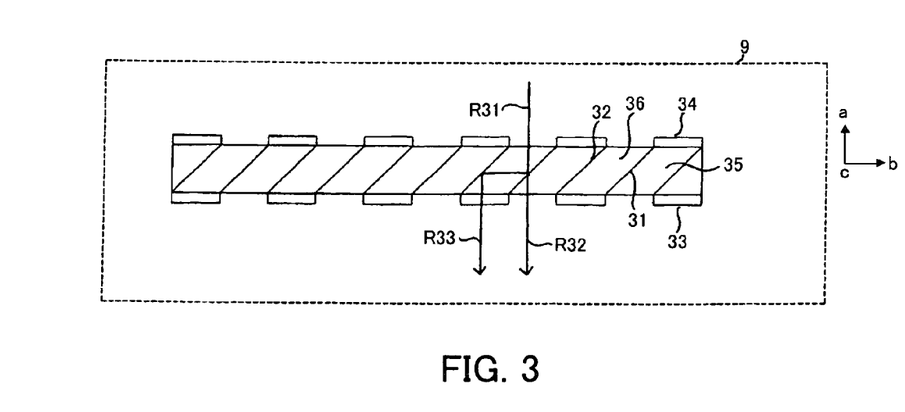
FIG. 3 is a sectional view showing a structure of a first polarization conversion element.

FIG. 3 shows a structure of the first polarization conversion element 9. The first polarization conversion element 9 includes a plurality of polarization splitting surfaces 31, a plurality of reflective surfaces 32, a plurality of half-wave plates 33, a plurality of light shielding plates 34, a plurality of first light transmitting members 35, and a plurality of second light transmitting members 36. The first light transmitting members 35 and the second light transmitting members 36 alternate between the polarization splitting surfaces 31 and the reflective surfaces 32. The light shielding plate 34 is pasted onto an incident surface of the first light transmitting member 35, and the half-wave plate 33 is pasted onto an exit surface of the second light transmitting member 36.

Light R31 incident upon the second light transmitting member 36 from between the light shielding plates 34 enters the polarization splitting surface 31. Among light R31 that has entered the polarization splitting surface 31, polarized light R32 that has a polarization direction in the "b" direction (Y direction in FIGS. 1 and 2) transmits through the polarization splitting surface 31 and the first light transmitting member 35, and exits out of the first polarization conversion element 9. Among light R31 that has entered the polarization splitting surface 31, polarized light R33 that has a polarization direction in the "c" direction (X direction) is reflected on the polarization splitting surface 31 and then reflected on the reflective surface 32. Then, a polarization direction of the polarized light R33 is rotated by 90° by the half-wave plate 33, and the polarized light R33 is converted into polarized light R33 that has a polarization direction of the "b" direction, and exits out of the first polarization conversion element 9. Thus, the first polarization conversion element 9 converts the incident light as non-polarized light into the linearly polarized light (first polarized light beam) which has a polarization direction in the "b" direction (Y direction as a first polarization direction), and emits it.

Figure 4:
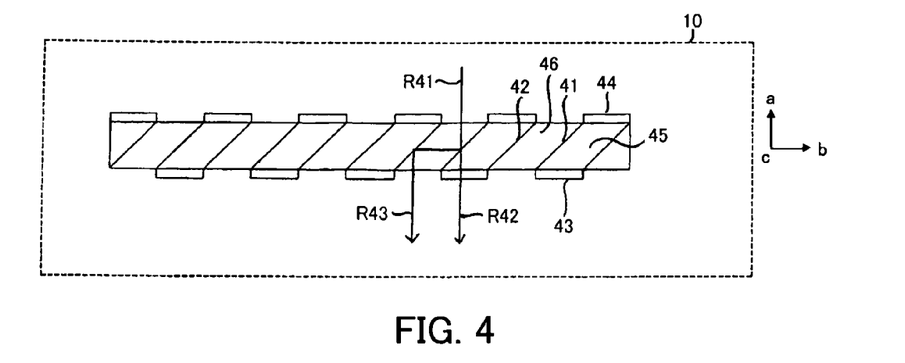
FIG. 4 is a sectional view showing a structure of a second polarization conversion element.

FIG. 4 shows a structure of the second polarization conversion element 10. The second polarization conversion element 10 includes a plurality of polarization splitting surfaces 41, a plurality of reflective surfaces 42, a plurality of half-wave plates 43, a plurality of light shielding plates 44, a plurality of first light transmitting members 45, and a plurality of second light transmitting members 46. The first light transmitting members 45 and the second light transmitting members 46 alternate between the polarization splitting surfaces 41 and the reflective surfaces 42. The light shielding plate 44 is pasted onto an incident surface of the first light transmitting member 45, and the half-wave plate 43 is pasted onto an exit surface of the first light transmitting member 45.

Light R41 incident upon the second light transmitting member 46 from between the light shielding plates 44 enters the polarization splitting surface 41. Among light R41 that has entered the polarization splitting surface 41, polarized light R42 that has a polarization direction in the "b" direction (Z direction in FIGS. 1 and 2) transmits the polarization splitting surface 41 and the first light transmitting member 45. Then, its polarization direction is rotated by 90° by the half-wave plate 43, and it is converted into polarized light R43 that has a polarization direction of the "c" direction, and exits out of the second polarization conversion element 10. Among the light R41 that has entered the polarization splitting surface 41, polarized light R43 that has a polarization direction in the "c" direction (X direction) is reflected on the polarization splitting surface 41 and then reflected on the reflective surface 42, and exits out of the second polarization conversion element 10. Thus, the second polarization conversion element 10 converts the incident light as non-polarized light into linearly polarized light (second polarized light beam) that has a polarization direction in the "c" direction (X direction as a second polarization direction), and emits it.

The third polarization conversion element 15 is configured similarly to the second polarization conversion element 10 shown in FIG. 4, but it is configured so that the exit light from the third polarization conversion element 15 can be linearly polarized light that has a polarization direction in the Y direction (polarized light beam having the same polarization direction as the polarization direction of one of the above first and second polarized light beams).

Figure 5:
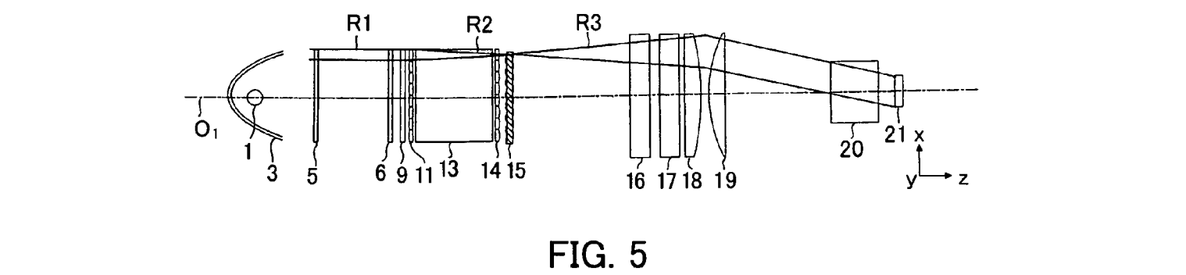
FIG. 5 is a view for explaining an optical operation of the optical system on the XZ section according to the first embodiment.
Figure 6:
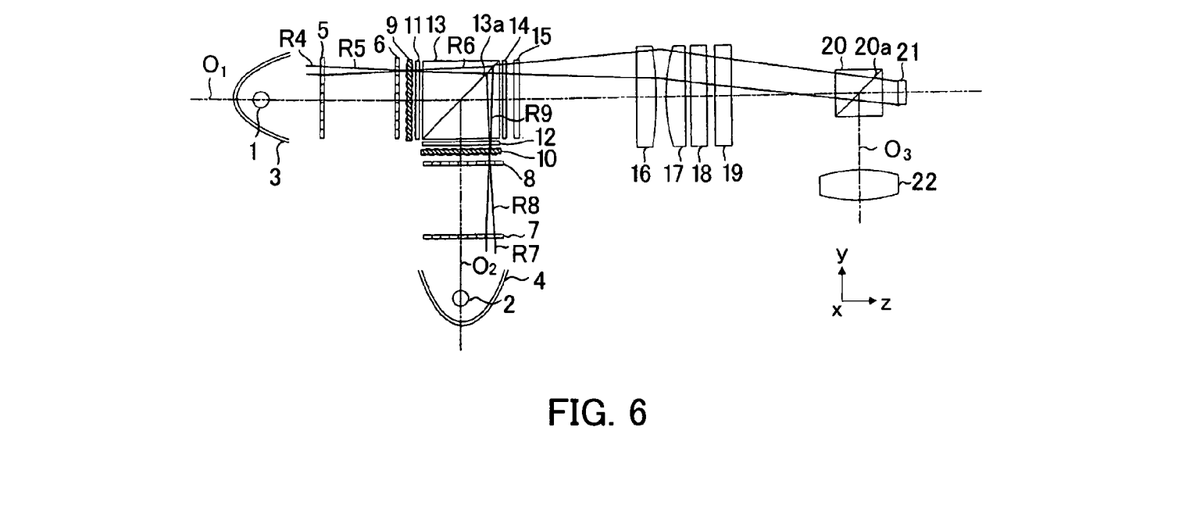
FIG. 6 is a view for explaining an optical operation of the optical system on the YZ section according to the first embodiment.
Figure 7:
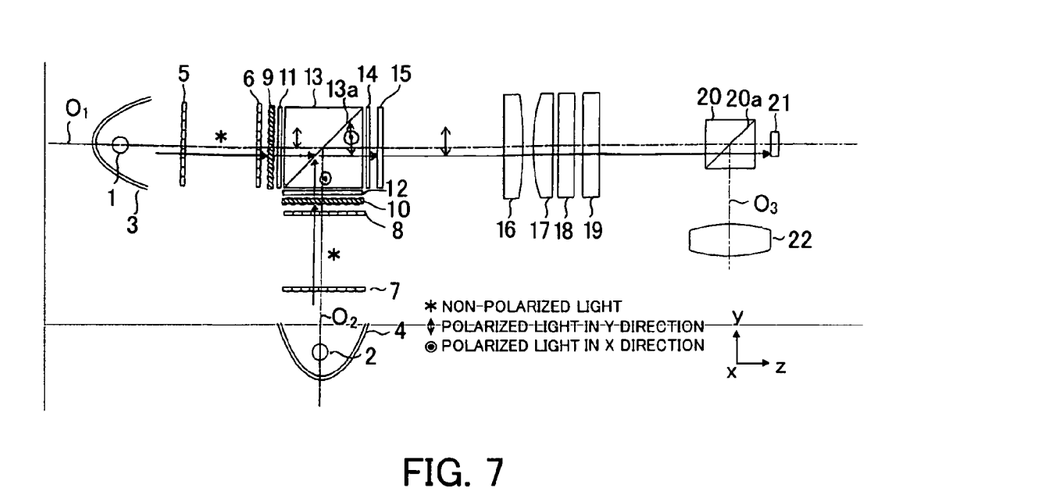
FIG. 7 is a view for explaining a polarization state of a light beam in the optical system according to the first embodiment.

Referring now to FIGS. 5, 6, and 7, a description will be given of an optical operation from the first light source 1 to the liquid crystal panel 21. FIG. 5 shows the XZ section of the optical system from the first light source 1 to the liquid crystal panel 21, and FIGS. 6 and 7 show the YZ section. FIGS. 5 and 6 show a light beam traveling path, and FIG. 7 shows a polarization state of the light beam.

A description will now be given of the optical operation on the XZ section shown in FIG. 5. A non-polarized light beam originated from the first light source 1 is reflected by the parabolic reflector 3, and most of it is converted into a collimated light beam R1 parallel to the optical axis $O_1$. The collimated light beam R1 transmits through the first cylinder array 5 and the second cylinder lens 6 each of which has no power on the XZ section, and passes the first polarization conversion element 9 (although it is actually converted into polarized light beam having a polarization direction in the Y direction).

The collimated light beam R1 is divided into a plurality of light beams R2 (polarized light beams) by the fifth cylinder array 11, and transmits through the polarization combining prism 13. The plurality of light beams R2 that have transmitted the polarization combining prism 13 are condensed near the seventh cylinder array 14 and the third polarization conversion element 15, form a plurality of secondary light source images of the first light source 1, and are emitted as a plurality of third polarized light beams R3 each of which has a polarization direction in the Y direction from the third polarization conversion element 15.

A plurality of polarized light beams R3 transmit through the first cylinder lens 16 and the second cylinder lens 17 each of which has no power on the XZ section, and are condensed on the liquid crystal panel 21 by the third cylinder lens 18 and the fourth cylinder lens 19 each of which has a power on the XZ section. Thereby, a plurality of polarized light beams R3, each of which has a polarization direction in the Y direction, are superimposed on the liquid crystal panel 21 (on the image display element) on the XZ section after transmitting through the polarization splitting prism 20, and uniformly illuminate the liquid crystal panel 21.

Next follows an operation on the YZ section shown in FIG. 6. A non-polarized light beam emitted from the first light source 1 is reflected by the parabolic reflector 3, and most of it is converted into collimated light beam R4 parallel to the optical axis $O_1$. The collimated light beam R4 is divided into a plurality of light beams R5 by the first cylinder array 5, is condensed near the second cylinder array 6 and the first polarization conversion element 9, and forms a plurality of secondary light source images of the first light source 1. These light beams are converted into a plurality of polarized light beams R6 having a polarization direction in the Y direction by the first polarization conversion element 9.

A plurality of polarized light beams R6 transmit through the fifth cylinder array 11 that has no power on the YZ section, and then transmit through the polarization combining surface 13a of the polarization combining prism 13. Next, the plurality of polarized light beams R6 transmit through the seventh cylinder array 14 that has no power on the YZ section, and pass the third polarization conversion element 15 while maintaining their polarization direction in the Y direction. The plurality of polarized light beams R6 are condensed towards the liquid crystal panel 21 by the first cylinder lens 16 and the second cylinder lens 17 each of which has a power on the YZ section, pass the third cylinder lens 18 and the fourth cylinder lens 19 each of which has no power on the YZ section, and reach the liquid crystal panel 21. The plurality of polarized light beams R6 having a polarization direction in the Y direction are superimposed on the liquid crystal panel 21 on the YZ section after transmitting the polarization splitting surface 20a of the polarization splitting prism 20 due to the condensing operations of the first and second cylinder lenses 16 and 17, and uniformly illuminate the liquid crystal panel 21.

Here, a combined focal length of the first and second cylinder lenses 16 and 17 on the YZ section is longer than a combined focal length of the third and fourth cylinder lenses 18 and 19 on the XZ section. In other words, the condenser optical system has focal lengths that are different between the YZ section and the XZ section.

Next follows the operation of the optical system from the second light source 2 to the liquid crystal panel 21. A light beam traveling path in the optical system from the second light source 2 to the liquid crystal panel 21 is basically the same as that of an optical system that is made by folding the optical system from the light source 1 to the liquid crystal panel 21 when the polarization combining surface 13*a* of the polarization combining prism 13 is regarded as a mirror.

However, the polarization state changes as follows: The non-polarized light beam emitted from the second light source 2 is reflected by the parabolic reflector 4, and most of it is converted into collimated light beam R7 parallel to the optical axis $O_2$. The collimated light beam R7 is divided into a plurality of light beams R8 by the third cylinder array 7, and the plurality of light beams R8 are condensed near the fourth cylinder array 8 and the second polarization conversion element 10, and form a plurality of secondary light source images of the second light source 2. A plurality of light beams R8 are converted into a plurality of polarized light beams R9 each having a polarization direction in the X direction by the second polarization conversion element 10. The plurality of polarized light beams R9 are reflected on the polarization combining surface 13*a*, and combined with a plurality of polarized light beams R6 that are originated from the first light source 1 and transmit through the polarization combining surface 13*a*. In addition, the plurality of polarized light beams R9 reflected on the polarization combining surface 13*a* are converted by the third polarization conversion element 15 into a plurality of polarized light beams each of which has a polarization direction in the Y direction that is same as the polarization direction of the light beam from the first light source 1.

The plurality of light beams R9 reflected on the polarization combining surface 13*a* are condensed similar to the light beam from the first light source 1, transmit through the polarization splitting prism 20 (polarization splitting surface 20*a*), and uniformly illuminate the liquid crystal panel 21.

Thus, a plurality of light beams from the first light source 1 side and a plurality of light beams from the second light source 2 side are combined with each other by the polarization combining surface 13*a*, and a plurality of combined light beams are condensed by the first to fourth cylinder lenses 16-19, and illuminate the liquid crystal panel 21 on both sections. In other words, polarization directions of the light beam from the first light source 1 and the light beam from the second light source 2 are made equal so that both light beams can illuminate the liquid crystal panel 21, and consequently a small illumination optical system can provide high illumination efficiency.

The light beam reflected, modulated, and converted into non-polarized light having a polarization direction in the X direction by the liquid crystal panel 21 is reflected by the polarization splitting surface 20*a* of the polarization splitting prism 20, and projected onto a projection surface (not shown), such as a screen, by the projection lens 22. A bright image can be displayed or projected by the synergy effect between a large light quantity of the light beams from the two light sources 1 and 2 and the high illumination efficiency of the illumination optical system.

While FIGS. 1-7 arrange the fifth cylinder array 11 between the first polarization conversion element 9 and the polarization combining prism 13, and the sixth cylinder array 12 between the second polarization conversion element 10 and the polarization combining prism 13, the fifth cylinder array 11 may be arranged at any position as long as it is located near the first polarization conversion element 9. For example, the fifth cylinder array 11 may be arranged between the first cylinder array 5 or the second cylinder array 6 and the first polarization conversion element 9. Similarly, the sixth cylinder array 12 may be arranged at any position as long as it is located near the second polarization conversion element 10. For example, the sixth cylinder array 12 may be arranged between the third cylinder array 7 or the fourth cylinder array 8 and the second polarization conversion element 10.

Figure 8:
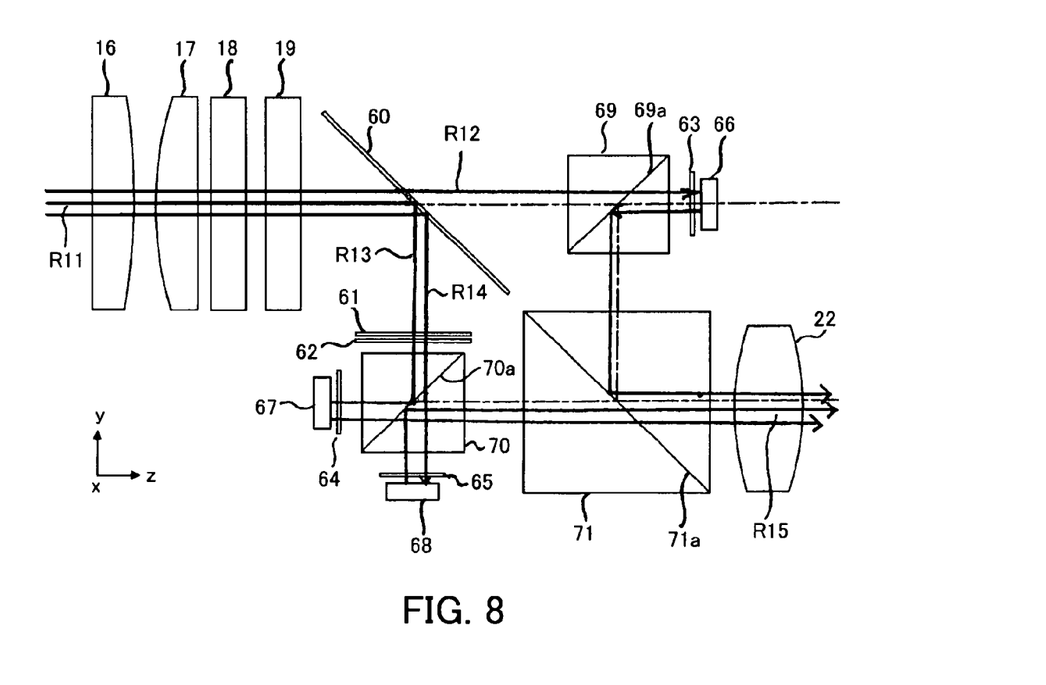
FIG. 8 is a view showing a color separation/combination optical system used for an image projection apparatus according to a variation of the first embodiment.

While FIGS. 1-7 show a single liquid crystal panel 21, a description will be given of a color separation/combination optical system configured to combine light beams from three liquid crystal panels after three color light beams R, G, and B are led to the three liquid crystal panels. FIG. 8 shows the YZ section of the optical system from the first cylinder lens 16 to the projection lens 22.

Reference numeral 60 denotes a dichroic element, reference numeral 61 denotes a polarizing plate, reference numeral 62 denotes a wavelength-selective phase plate, reference numeral 63 denotes a first quarter-wave plate, reference numeral 64 denotes a second quarter-wave plate, and reference numeral 65 denotes a third quarter-wave plate. Reference numeral 66 denotes a first liquid crystal panel, reference numeral 67 denotes a second liquid crystal panel, and reference numeral 68 denotes a third liquid crystal panel. Reference numeral 69 denotes a first polarization splitting prism, reference numeral 70 denotes a second polarization splitting prism, and reference numeral 71 denotes a combining prism. Reference numeral 69*a* denotes a polarization splitting surface in the first polarization splitting prism 69, reference numeral 70*a* denotes a polarization splitting surface in the second polarization splitting prism 70, and reference numeral 71*a* denotes a combining surface of the combining prism 71.

White polarized light R11 that has passed from the first cylinder lens 16 to the fourth cylinder lens 19 and possesses a polarization direction in the Y direction is separated by the dichroic element 60 into G band light R12, R band light R13, and B band light R14.

The G band light R12 transmits the polarization splitting surface 69*a* in the first polarization splitting prism 69, passes the first quarter-wave plate 63, and illuminates the first liquid crystal panel 66. The G band light R12 reflected, modulated, and converted into polarized light having a polarization direction in the X direction by the first liquid crystal panel 66 passes the first quarter-wave plate 63, is reflected by the polarization splitting surface 69*a* in the first polarization splitting prism 69, and is led to the combining prism 71.

The R band light R13 and the B band light R14 pass the polarizing plate 61. The R band light R13 is converted into the polarized light having a polarization direction in the X direction by the wavelength-selective phase plate 62. The B band light R14 transmits the wavelength-selective phase plate 62 as the polarized light having a polarization direction in the Y direction.

The R band light R13 is reflected by the polarization splitting surface 70*a* in the second polarization splitting prism 70, passes the second quarter-wave plate 64, and illuminates the second liquid crystal panel 67. The R band light R13 reflected, modulated, and converted into polarized light having a polarization direction in the Y direction by the second liquid crystal panel 67 passes the first quarter-wave plate 64, transmits the polarization splitting surface 70*a* in the second polarization splitting prism 70, and is led to combining prism 71.

The B band light R14 transmits the polarization splitting surface 70*a* in the second polarization splitting prism 70, passes the third quarter-wave plate 65, and illuminates the third liquid crystal panel 68. The B band light R14 reflected, modulated, and converted into polarized light having a polarization direction in the X direction by the third liquid crystal panel 68 passes the third quarter-wave plate 65, is reflected by polarization splitting surface 70a in the second polarization splitting prism 70, and is led to the combining prism 71.

The G band light R12 led to the combining prism 71 is reflected on its combining surface 71a, and combined with the R band light R13 and the B band light R14 that have transmitted through the combining surface 71a. Combined light beam R15 is projected onto the projection surface by the projection lens 22.

This embodiment can provide high conversion efficiency in each polarization conversion element and high illumination efficiency in the illumination optical system.

Second Embodiment

Figure 9:
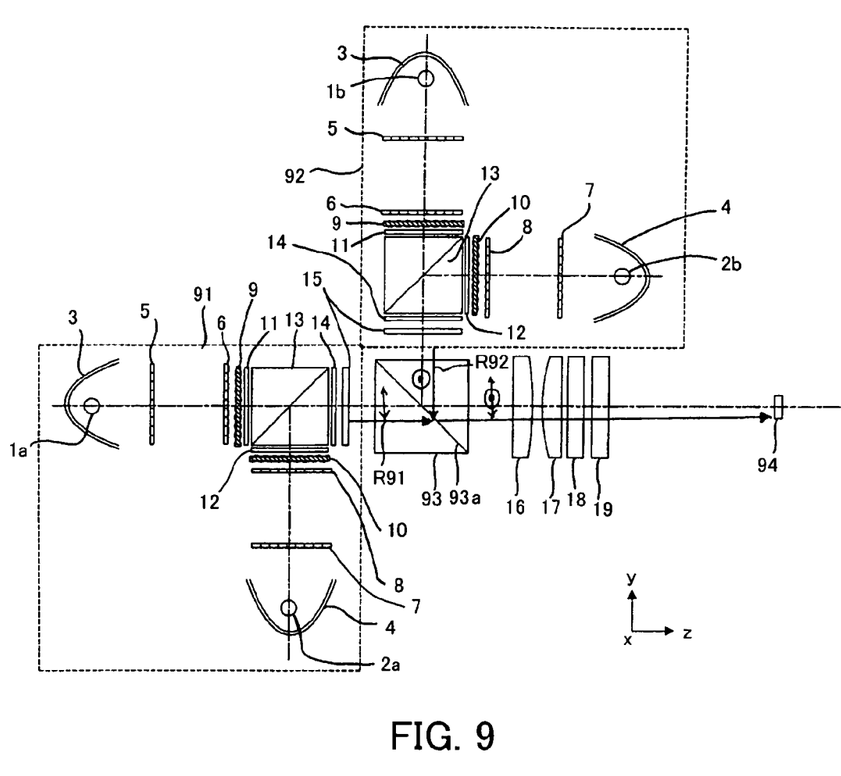
FIG. 9 shows a YZ section of an optical system in an image projection apparatus according to a second embodiment of the present invention.

FIG. 9 shows a YZ section of an optical system (which is an optical system from the light source to the image display element) in an image projection apparatus (image display apparatus) according to a second embodiment of the present invention.

This embodiment utilizes a four-beam type image projection apparatus that includes four light sources, and a micro-mirror device (referred to as "mirror panel" hereinafter) configured to modulate a light beam through a plurality of movable micro-mirrors as an image display element. The illumination optical system of this embodiment includes a first optical system 91 and a second optical system 92 (each corresponding to a structure from the light source to the third polarization conversion element 15 in the first embodiment).

The first optical system 91 includes two light source 1a and 2a corresponding to the first and second light sources 1 and 2 shown in FIGS. 1 and 2, reflectors 3 and 4, first to seventh cylinder arrays 5-8, 11, 12, and 14, first to third polarization conversion elements 9, 10, and 15, and a polarization combining prism 13.

The second optical system 92 includes two light sources 1b and 2b different from the light sources 1a and 2a corresponding to the first and second light sources 1 and 2 shown in FIGS. 1 and 2, reflectors 3 and 4, first to seventh cylinder arrays 5-8, 11, 12, and 14, the first to third polarization conversion elements 9, 10, and 15, and a polarization combining prism 13.

The third installed polarization conversion element 15 in the first optical system 91 emits a plurality of polarized light beams R91, each of which has a polarization direction in the Y direction, which is one of the X direction and the Y direction. The third polarization conversion element 15 in the second optical system 92 emits a plurality of polarized light beams R92, each of which has a polarization direction in the other direction (X direction).

A plurality of polarized light beams R91 transmit a polarization combining surface 93a in a second polarization combining prism 93 as a second beam combining unit. A plurality of polarized light beams R92 are reflected on the polarization combining surface 93a in the second polarization combining prism 93. Thereby, a plurality of polarized light beams R91 and a plurality of polarized light beams R92 are combined with each other. A plurality of combined (non-polarized) light beams are superimposed by the first to fourth cylinder lenses 16-19 shown in FIGS. 1 and 2 onto the mirror panel 94, and uniformly illuminate the mirror panel 94. The light beam modulated by mirror panel 94 is projected onto the projection surface through the projection lens (not shown).

The thus-configured small illumination optical system combines light beams from the four light sources 1a, 1b, 2a, and 2b, and can illuminate the mirror panel 94 with high illumination efficiency.

Third Embodiment

Figure 10:
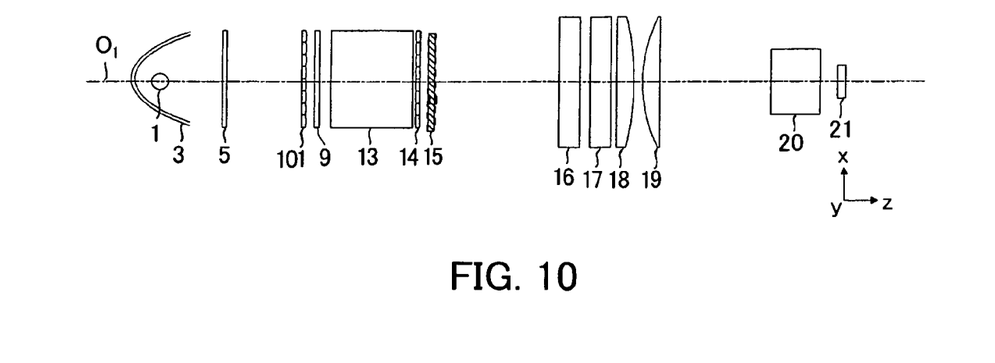
FIG. 10 shows an XZ section of an optical system in an image projection apparatus according to a third embodiment of the present invention.
Figure 11:
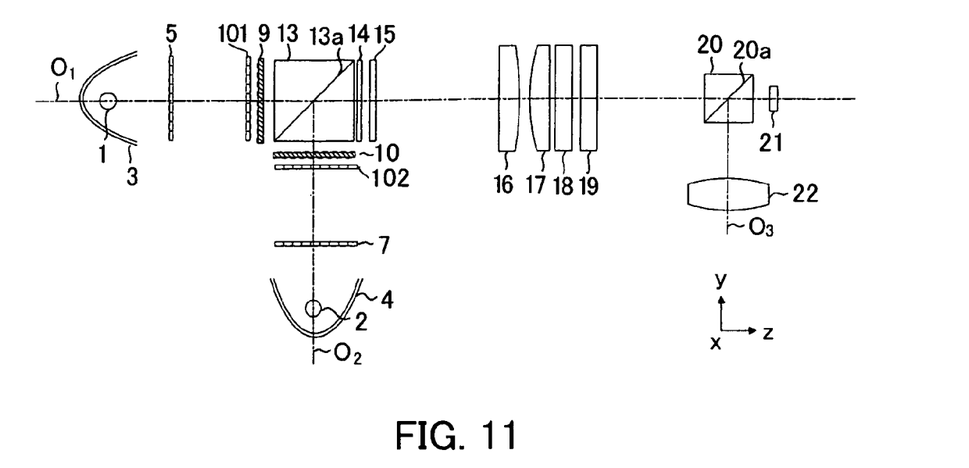
FIG. 11 shows a YZ section of the optical system according to the third embodiment.

FIG. 10 shows an XZ section and FIG. 11 shows a YZ section of an overall optical system in an image projection apparatus (image display apparatus) according to a third embodiment of the present invention. This embodiment has a configuration similar to that of the first embodiment, and the components common to those of the first embodiment are designated by the same reference numerals as the first embodiment.

However, this embodiment integrates the second cylinder array 6 and the fifth cylinder array 11 described in first embodiment into a first fly-eye lens 101, and the fourth cylinder array 8 and the sixth cylinder array 12 described in first embodiment into the second fly-eye lens 102. The first fly-eye lens 101 corresponds to the first beam splitting unit and the second fly-eye lens 102 corresponds to the second beam splitting unit.

This configuration can reduce the number of optical elements in the illumination optical system, while maintaining the polarization conversion efficiency and the illumination efficiency equivalent with those of the illumination optical system of the first embodiment.

Fourth Embodiment

Figure 12:
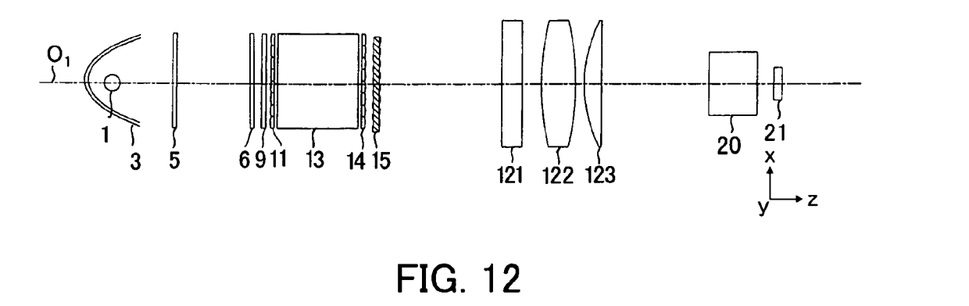
FIG. 12 shows an XZ section of an optical system in an image projection apparatus according to a fourth embodiment of the present invention.
Figure 13:
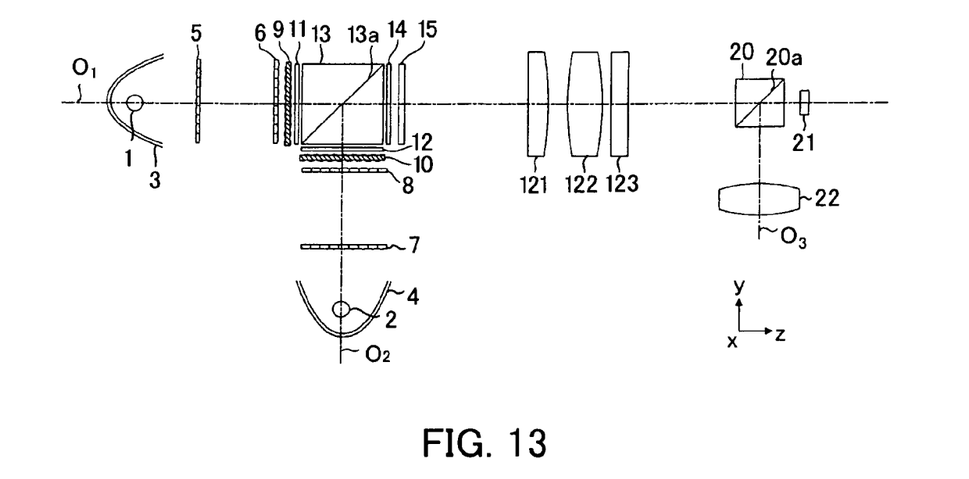
FIG. 13 shows a YZ section of the optical system according to a fourth embodiment.

FIG. 12 shows an XZ section and FIG. 13 shows a YZ section of an overall optical system in an image projection apparatus (image display apparatus) according to a fourth embodiment of the present invention. Components common to those of the first embodiment are designated by the same reference numerals as the first embodiment.

This embodiment is different from the first embodiment in a structure of a condenser optical system. The first embodiment makes different principal points (or focal lengths) of the condenser optical system that includes the first to fourth cylinder lenses 16-19 between the XZ section and the YZ section. This structure can be achieved by combining lenses other than the first to fourth cylinder lenses 16-19.

In this embodiment, the condenser optical system includes a cylinder lens 121 that has a power only on the YZ section, a toric lens 122 that has a power on the XZ section different from a power on the YZ section, and a cylinder lens 123 that has a power only on the YZ section.

This configuration can reduce the number of optical elements in the condenser optical system or the illumination optical system, while maintaining the polarization conversion efficiency and the illumination efficiency equivalent with those of the illumination optical system of the first embodiment.

Fifth Embodiment

Figure 14:
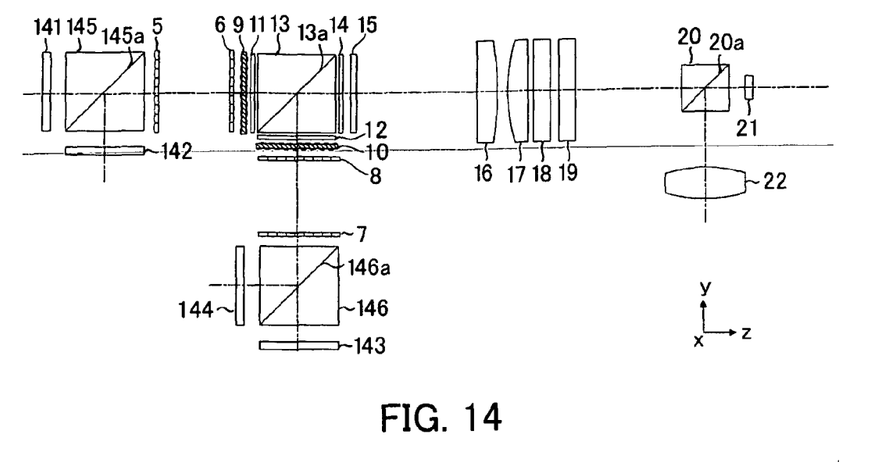
FIG. 14 shows a YZ section of an optical system in an image projection apparatus according to a fifth embodiment of the present invention.

FIG. 14 shows a YZ section of an overall optical system in an image projection apparatus (image display apparatus) according to a fifth embodiment of the present invention. This embodiment is configured similarly to the first embodiment, and the components common to those of the first embodiment are designated by the same reference numerals as the first embodiment.

In this embodiment, each of the first and second light sources includes a plurality of (two) polarization light source units (laser light sources) each configured to emit polarized light.

The first light source includes a first laser light source 141, a second laser light source 142, and a polarization combining prism 145 as a light source combining unit. The second light source includes a third laser light source 143, a fourth laser light source 144, and a polarization combining prism 146 as a light source combining unit. This embodiment provides no reflector.

The first laser light source 141 emits a polarized light beam having a polarization direction in the Y direction, and the second laser light source 142 emits a polarized light beam having a polarization direction in the X direction. These polarized light beams are combined by a polarization combining surface 145a in polarization combining prism 145, and the combined non-polarized light beam enters the first cylinder array 5. Thereafter, it advances similar to the first embodiment, and reaches the liquid crystal panel 21.

The third laser light source 143 emits a polarized light beam having a polarization direction in the Y direction, and the fourth laser light source 144 emits a polarized light beam having a polarization direction in the X direction. These polarized light beams are combined on a polarization combining surface 146a in the polarization combining prism 146, and the combined non-polarized light beam enters the third cylinder array 7. Thereafter, it advances similar to the first embodiment, and reaches the liquid crystal panel 21.

Thus, the polarization light source units each used as a light source enables light beams from the four light sources to be combined and the combined light beam to be introduced to the liquid crystal panel 21 by using the illumination optical system similar to the illumination optical system that uses two lamps.

Sixth Embodiment

Figure 15:
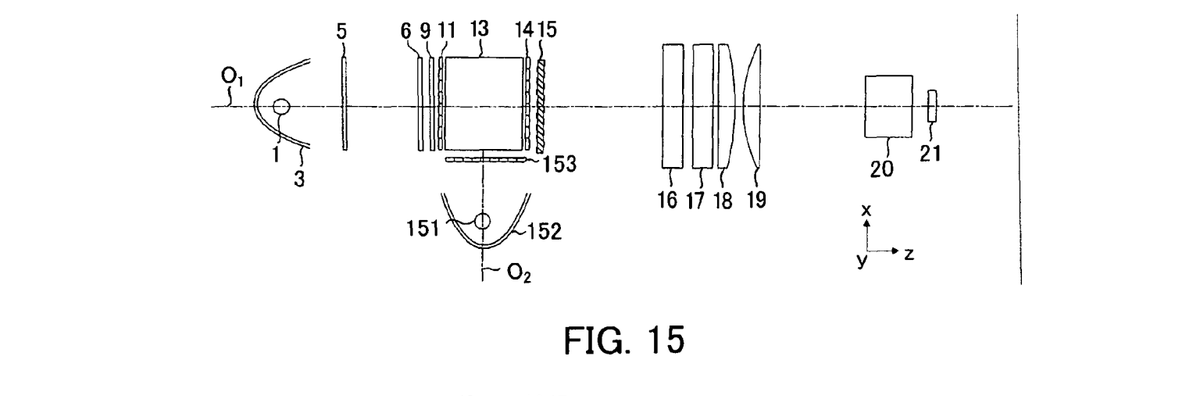
FIG. 15 shows an XZ section of an optical system in an image projection apparatus according to a sixth embodiment of the present invention.
Figure 16:
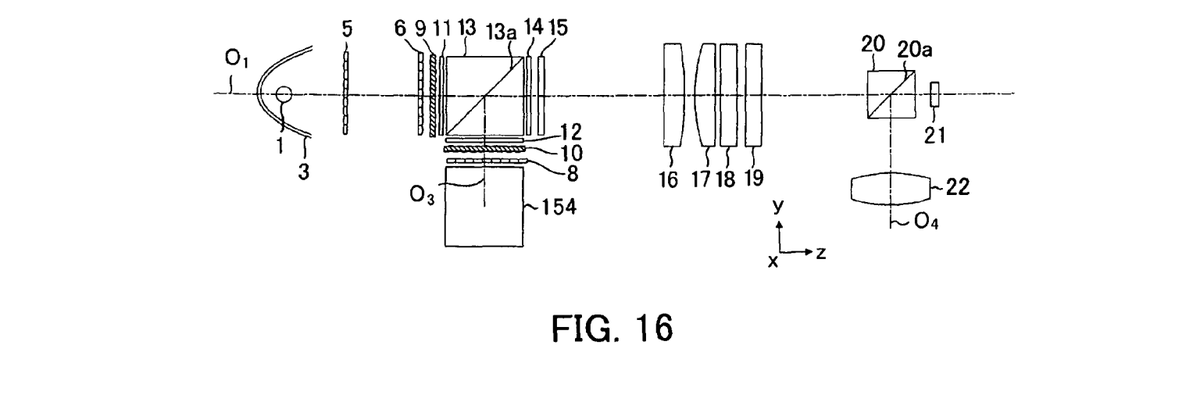
FIG. 16 shows a YZ section of the optical system according to the sixth embodiment.
Figure 17:
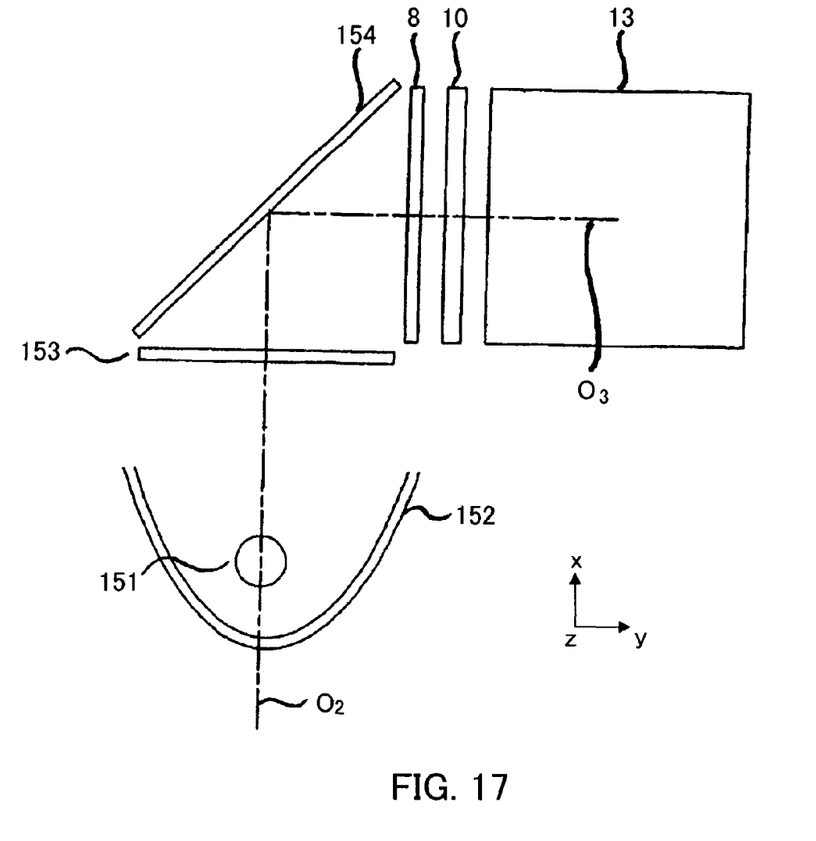
FIG. 17 shows an XY section of a part of the optical system according to the sixth embodiment.

FIG. 15 shows an XZ section and FIG. 16 shows a YZ section of an overall optical system in an image projection apparatus (image display apparatus) according to a sixth embodiment of the present invention. FIG. 17 shows the XY section of a part of the optical system. This embodiment shows an image projection apparatus that is made smaller.

This embodiment has a configuration similar to that of the first embodiment, and the components common to those of the first embodiment are designated by the same reference numerals as the first embodiment.

However, this embodiment is different from the first embodiment in the structure around the second light source as shown in FIG. 17. In FIG. 17, reference numeral 151 denotes a second light source, and reference numeral 152 denotes a second parabolic reflector. Reference numeral 153 denotes a third cylinder array, and reference numeral 154 denotes a mirror.

Non-polarized light beam from the second light source 151 is reflected by the parabolic reflector 152, and advances toward in the X direction.

The mirror 154 is arranged between the third cylinder array 153 and the fourth cylinder array 8 so as to form an angle of 45° relative to each of the optical axis O2 and the optical axis O3. The mirror 154 reflects the light beam from the second light source 151 in the Y direction. The light beam reflected on the mirror 154 enters the fourth cylinder array 8. Thereafter, it advances similar to the first embodiment, and reaches the liquid crystal panel 21.

In this embodiment, the mirror 154 and the polarization combining surface 13a of and the polarization combining prism 13 are skew. Therefore, the third cylinder array 153 is formed as a cylinder array having a power on the XZ section orthogonal to the YZ section in which the fourth cylinder array 8 has a power.

This configuration can reduce projection amounts of the second light source 151 and the parabolic reflector 152 on the YZ section, and can make smaller the image projection apparatus as a whole.

Seventh Embodiment

Figure 18:
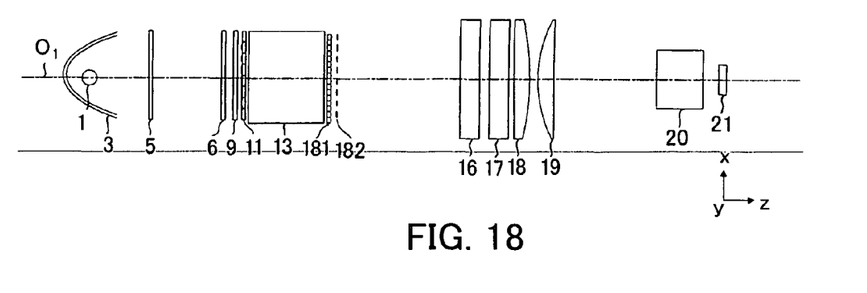
FIG. 18 shows an XZ section in an optical system in an image projection apparatus according to a seventh embodiment of the present invention.
Figure 19:
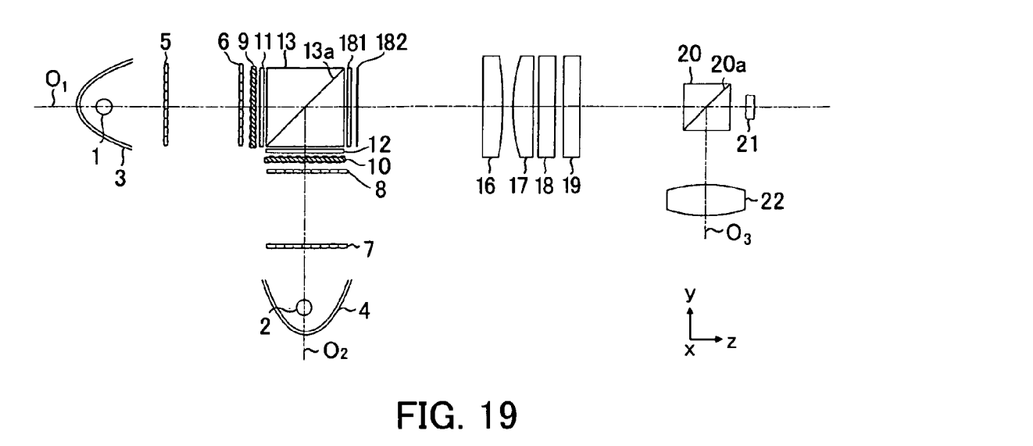
FIG. 19 shows a YZ section of the optical system according to the seventh embodiment.
Figure 20:
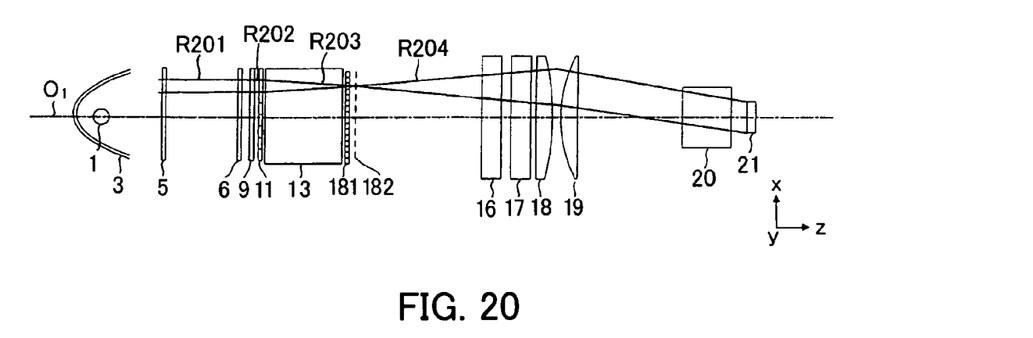
FIG. 20 is a view for explaining an optical operation on a first light source in the optical system according to the seventh embodiment.

FIG. 18 shows an XZ section and FIG. 19 shows a YZ section of an overall optical system in an image projection apparatus (image display apparatus) according to a seventh embodiment of the present invention. FIG. 20 shows a light beam traveling path on the XZ section. This embodiment has a configuration similar to that of the first embodiment, and the components common to those of the first embodiment are designated by the same reference numerals as the first embodiment.

This embodiment uses a phase plate array 182 as a third polarization conversion element in place of the third polarization conversion element 15 described in the first embodiment. Along with this replacement of the phase plate array 182, the seventh cylinder array 14 described in the first embodiment is replaced with the seventh cylinder array 181 having a smaller cylinder lens pitch. The cylinder lens pitch of the seventh cylinder array 181 is half of the pitch of each of the fifth and sixth cylinder arrays 11 and 12.

The phase plate array 182 includes a plurality of half-wave plates (phase plates) that are spaced from each other. A plurality of half-wave plates are arranged so as to oppose to alternate lenses in a plurality of cylinder lenses in the seventh cylinder array 181.

Since the optical operation on the YZ section from the first light source 1 to the liquid crystal panel 21 is the same as that of the first embodiment, a description will be given of the optical operation on the XZ section from the first light source 1 to the liquid crystal panel 21 with reference to FIG. 20.

The non-polarized light beam emitted from the first light source 1 is reflected on the parabolic reflector 3, and most of it is converted into collimated light beam R201 parallel to the optical axis $O_1$. The collimated light beam R201 transmits the first cylinder array 5 and the second cylinder lens 6 each of which has no power on the XZ section, and is converted into polarized light beam R202 having a polarization direction in the Y direction by the first polarization conversion element 9.

The polarized light beam R202 is divided into a plurality of polarized light beams R203 by the fifth cylinder array 11, and the plurality of the polarized light beams R203 transmit the polarization combining prism 13 and the seventh cylinder array 181 and are condensed onto the half-wave plates of the phase plate array 182. The half-wave plates rotate the polarization directions of the plurality of polarized light beams R203 by 90°, and the plurality of polarized light beams R203 are converted into a plurality of polarized light beams R204 each having a polarization direction in the X direction. The plurality of polarized light beams R204 are superimposed on the liquid crystal panel 21 via the first to fourth cylinder lens 16-19 and the polarization splitting prism 20. The polarization splitting prism 20 of this embodiment transmits the polarized light beam having a polarization direction in the X direction, and reflects a polarized light beam having a polarization direction in the Y direction.

Figure 21:
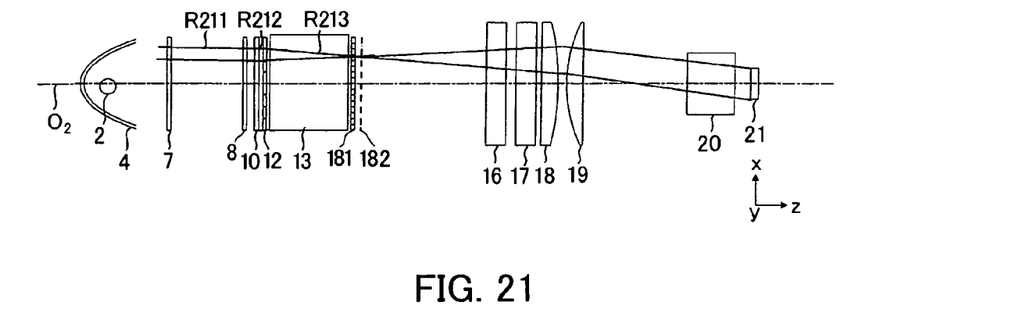
FIG. 21 is a view for explaining an optical operation on a second light source in the optical system according to the seventh embodiment.

Referring now to FIG. 21, a description will be given of an optical operation on the XZ section from the second light source 2 to the liquid crystal panel 21. FIG. 21 shows a light beam traveling path in the optical system which excludes a reflection on the polarization combining surface 13a.

The non-polarized light beam emitted from the second light source 2 is reflected on the parabolic reflector 4, and most of it is converted into collimated light beam R211 parallel to the optical axis $O_2$. The collimated light beam R211 transmits the third cylinder array 7 and the fourth cylinder lens 8 each of which has no power on the XZ section, and is converted into polarized light beam R212 having a polarization direction in the X direction by the first polarization conversion element 10. The polarized light beam R212 is divided into a plurality of polarized light beams R213 by the sixth cylinder array 12, and the plurality of the polarized light beams R213 are reflected on the polarization combining surface 13a in the polarization combining prism 13, transmit the seventh cylinder array 181, and are condensed in an area between the half-wave plates of phase plate arrays 182.

The plurality of polarized light beams R213 are superimposed on the liquid crystal panel 21 via the first to fourth cylinder lens 16-19 and the polarization splitting prism 20.

When the third polarization conversion element 15 is thus composed of the phase plate array 182, the illumination efficiency can become better than that for use with the polarization conversion element having the structure described in the first embodiment (FIG. 4), because the polarization splitting film and the reflective surface have no light quantity loss.

The phase plate array 182 may be arranged between the polarization combining prism 13 and the seventh cylinder array 181.

As described above, each embodiment can provide excellent polarization conversion efficiency in the polarization conversion element, and high illumination efficiency. In addition, an optical system can be made small because the light beams are combined by utilizing the polarization components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-139362, filed May 28, 2008, which is hereby incorporated by reference herein in its entirety.

What is claimed is:

1. An image display apparatus configured to display an image, the image display apparatus comprising:
   an illumination optical system configured to introduce a first light beam that originates from a first light source and a second light beam that originates from a second light source to an image display element, wherein the illumination optical system includes:
   a first beam splitting unit configured to split the first light beam into a plurality of light beams on a first section, wherein the first beam splitting unit includes a cylinder lens array,
   a second beam splitting unit configured to split the first light beam into a plurality of light beams on a second section orthogonal to the first section,
   a first polarization conversion element configured to convert the first light beam into first polarized light beams having a first polarization direction,
   a third beam splitting unit configured to split the second light beam into a plurality of light beams on the first section, wherein the third beam splitting unit includes a cylinder lens array,
   a fourth beam splitting unit configured to split the second light beam into a plurality of light beams on a third section orthogonal to the first section and the second section,
   a second polarization conversion element configured to convert the second light beam into second polarized light beams having a second polarization direction orthogonal to the first polarization direction,
   a first beam combining unit configured to combine, into combined light beams, a plurality of the first polarized light beams that have passed the first beam splitting unit, the second beam splitting unit, and the first polarization conversion element with a plurality of the second polarized light beams that have passed the third beam splitting unit, the fourth beam splitting unit, and the second polarization conversion element,
   a third polarization conversion element configured to convert a plurality of the combined light beams from the first beam combining unit into a plurality of polarized light beams having a polarization direction of one of the first polarization direction and the second polarization direction,
   a condensing unit configured to superimpose the plurality of polarized light beams from the third polarization conversion element onto the image display element, and
   wherein a focal length of the condensing unit on the first section is different from a focal length of the condensing unit on the second section.

2. The image display apparatus according to claim 1, wherein the second beam splitting unit is arranged between the first polarization conversion element and the first beam combining unit, and the fourth beam splitting unit is arranged between the second polarization conversion element and the first beam combining unit.

3. The image display apparatus according to claim 1, wherein the illumination optical system further comprises:
   a first optical system provided to each of two light sources corresponding to the first and second light sources, and configured to emit the plurality of polarized light beams having the polarization direction of the one of the first polarization direction and the second polarization direction, wherein the first optical system includes the first to fourth beam splitting units, the first to third polarization conversion elements, and the first beam combining unit;
   a second optical system provided to each of two light sources other than the two light sources corresponding to the first and second light sources, and configured to emit a light beam having a polarization direction of the other of the first polarization direction and the second polarization direction, wherein the second optical system includes the first to fourth beam splitting units, the first to third polarization conversion elements, and the first beam combining unit; and
   a second beam combining unit configured to combine a light beam from the first optical system with a light beam from the second optical system, and to introduce a combined light beam to the condensing unit.

4. The image display apparatus according to claim 1, wherein each of the first and second light sources includes:
   a plurality of polarization light sources, wherein each light source is configured to emit a light beam having the first polarization direction and a light beam having the second polarization direction, and
   a light source combining unit configured to combine light beams from the plurality of polarization light sources.

5. The image display apparatus according to claim 1, wherein the third polarization conversion element includes a phase plate array that includes a plurality of spaced phase plates.

6. The image display apparatus according to claim 1, further comprising a projection optical system configured to project a light beam from the image display element onto a projection surface.

7. The image display apparatus according to claim 1,
wherein the first and the second polarization conversion elements include a plurality of first polarization splitting surfaces, wherein the plurality of first polarization splitting surfaces are arranged along a direction parallel to the first section, and
wherein the third polarization conversion element includes a plurality of second polarization splitting surfaces, wherein the plurality of second polarization splitting surfaces are arranged along a direction parallel to the second section.

8. The image display apparatus according to claim 1, wherein the third polarization conversion element is provided adjacent to a position in which a light source image is formed by the second and fourth beam splitting units.

9. The image display apparatus according to claim 1,
wherein the first beam splitting unit is configured to split the first light beam into a plurality of light beams on the first section only,
wherein the second beam splitting unit is configured to split the first light beam into a plurality of light beams on the second section only,
wherein the third beam splitting unit is configured to split the second light beam into a plurality of light beams on the first section only, and
wherein the fourth beam splitting unit is configured to split the second light beam into a plurality of light beams on the third section only.

10. The image display apparatus according to claim 1, wherein
the first and the third beam splitting units are cylinder arrays that include a plurality of first cylinder lenses, and the plurality of first cylinder lenses are arranged along a direction parallel to the first section,
the third beam splitting unit is cylinder lens array that includes a plurality of second cylinder lenses, and the plurality of second cylinder lenses are arranged along a direction parallel to the second section, and
the fourth beam splitting unit is cylinder lens array that includes a plurality of third cylinder lenses, and the plurality of third cylinder lenses are arranged along a direction parallel to the third section.

11. An illumination optical system configured to introduce a first light beam that originates from a first light source and a second light beam that originates from a second light source to an image display element, the illumination optical system comprising:
a first beam splitting unit configured to split the first light beam into a plurality of light beams on a first section, wherein the first beam splitting unit includes a cylinder lens array;
a second beam splitting unit configured to split the first light beam into a plurality of light beams on a second section orthogonal to the first section;
a first polarization conversion element configured to convert the first light beam, which originated as a non-polarized light beam, into first polarized light beams having a first polarization direction;
a third beam splitting unit configured to split the second light beam into a plurality of light beams on the first section, wherein the third beam splitting unit includes a cylinder lens array;
a fourth beam splitting unit configured to split the second light beam into a plurality of light beams on a third section orthogonal to the first and the second sections;
a second polarization conversion element configured to convert the second light beam, which originated as a non-polarized light beam, into second polarized light beams having a second polarization direction orthogonal to the first polarization direction, wherein the first and the second polarization conversion elements each include a plurality of polarization beam splitting surfaces, and the polarization splitting surfaces are arranged along a direction parallel to the first section;
a first beam combining unit configured to combine a plurality of the first polarized light beams that have passed the first beam splitting unit, the second beam splitting unit, and the first polarization conversion element with a plurality of the second polarized light beams that have passed the third beam splitting unit, the fourth beam splitting unit, and the second polarization conversion element;
a third polarization conversion element configured to convert a plurality of combined light beams from the first beam combining unit into a plurality of polarized light beams having a polarization direction of one of the first polarization direction and the second polarization direction, wherein the third polarization conversion element includes a plurality of polarization beam splitting surfaces, and the polarization splitting surfaces are arranged along a direction parallel to the second section; and
a condensing unit configured to superimpose the plurality of polarized light beams from the third polarization conversion element onto the image display element, and
wherein a focal length of the condensing unit on the first section is different from a focal length of the condensing unit on the second section.

12. The illumination optical system according to claim 11, wherein the second beam splitting unit is positioned adjacent to the first polarization conversion element so as to be near the first polarization conversion element and is positioned between the first beam combining unit and the first polarization conversion element.

13. The illumination optical system according to claim 11, further comprising:
a cylinder lens array positioned between the first beam combining unit and the third polarization conversion element and configured to condense light beams that have transmitted the first beam combining unit.

14. The illumination optical system according to claim 13, wherein a cylinder lens pitch of the cylinder lens array positioned between the first beam combining unit and the third polarization conversion element is half of a cylinder lens pitch of each of the second beam splitting unit and the fourth beam splitting unit.

15. The illumination optical system according to claim 13, wherein the cylinder lens array positioned between the first beam combining unit and the third polarization conversion element has a power on the second section, but has no power on the first section.

* * * * *